United States Patent
Iizuka

(12) 
(10) Patent No.: US 6,937,373 B2
(45) Date of Patent: Aug. 30, 2005

(54) SCANNING OPTICAL SYSTEM

(75) Inventor: Takashi Iizuka, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 43 days.

(21) Appl. No.: 10/023,667

(22) Filed: Dec. 21, 2001

(65) Prior Publication Data
US 2002/0114050 A1 Aug. 22, 2002

(30) Foreign Application Priority Data
Dec. 22, 2000 (JP) ........................................ 2000-390182

(51) Int. Cl.$^7$ ............................................ G02B 26/08
(52) U.S. Cl. ...................................... 359/204; 347/243
(58) Field of Search ........................... 359/204, 205–207, 359/216–219, 226, 831, 837; 347/232–235, 243, 244; 250/234–236

(56) References Cited

U.S. PATENT DOCUMENTS

| | | | | |
|---|---|---|---|---|
| 5,124,829 A | * | 6/1992 | Ishikawa | ..................... 359/204 |
| 5,739,940 A | * | 4/1998 | Kondo | ........................ 359/204 |
| 6,115,164 A | | 9/2000 | Kamikubo | .................. 359/196 |
| 6,124,962 A | | 9/2000 | Kamikubo | .................. 359/205 |
| 6,178,029 B1 | | 1/2001 | Kamikubo | .................. 359/204 |
| 6,259,547 B1 | | 7/2001 | Kamikubo | .................. 359/205 |

FOREIGN PATENT DOCUMENTS

JP    2000-155277    6/2000

* cited by examiner

Primary Examiner—Euncha P. Cherry
(74) Attorney, Agent, or Firm—Greenblum & Bernstein, P.L.C.

(57) ABSTRACT

A multi-beam scanning optical system is provided with light sources that emit a plurality of laser beams having different wavelengths, respectively, a single deflector which deflects the plurality of laser beams simultaneously, an imaging optical system that converges the plurality of laser beams deflected by the single deflector on the surface to be scanned, and a beam detector that receives the plurality of laser beams directed to outside of the predetermined imaging area via at least one of lens elements included in the imaging optical system, a synchronizing signal being generated upon detection of each of the plurality of light beams by the beam detector. It should be noted that an optical characteristic of the imaging optical system is configured such that the laser beams directed to the predetermined imaging area are aligned in a scanning direction, while the beams directed to the beam detector are shifted in the scanning direction.

9 Claims, 4 Drawing Sheets

LINEARITY ERROR

CURVATURE OF FIELD

- - - - MAIN SCANNING DIRECTION
―――― AUXILIARY SCANNING DIRECTION

LATERAL CHROMATIC
ABERRATION
(WITHOUT DIFFRACTIVE LENS)

LATERAL CHROMATIC
ABERRATION
(WITH DIFFRACTIVE LENS)

SCANNING OPTICAL SYSTEM

BACKGROUND OF THE INVENTION

The present invention relates to a scanning optical system for a laser beam printer or the like, and particularly to a multi-beam scanning optical system using a plurality of beams.

Conventionally, a multi-beam scanning optical system has been widely employed. The multi-beam scanning optical system is advantageous in that a plurality of scanning lines can be formed simultaneously. The multi-beam scanning optical system typically includes a plurality of laser sources respectively emitting a plurality of laser beams. The plurality of laser beams are simultaneously deflected by a polygonal mirror. The deflected laser beams passes through an fθ lens, which converges the plurality of laser beams on a surface, such as a photoconductive surface of a photoconductive drum, to be scanned to form a plurality of beam spots. As the polygonal mirror rotates, the beam spots formed on the photoconductive drum move to form a plurality of scanning lines thereon. The direction in which the beam spots move is parallel with the rotational axis of the photoconductive drum. Further, the photoconductive drum is rotated so that the photoconductive surface thereof is two-dimensionally exposed to the plurality of beams.

In this specification, a direction in which the beam spots move (i.e., a direction in which the scanning lines extend) will be referred to as a main scanning direction. Further, a direction in which the surface to be scanned moves with respect to the scanning lines, i.e., the rotation direction of the photoconductive drum will be referred to as an auxiliary scanning direction. In the following description, the shape of optical elements, directions of powers of the optical elements and the like are described with reference to the main and auxiliary scanning directions on the surface to be scanned. That is, if an optical element is described to have a refractive power in the main scanning direction, the power affects the beam in the main scanning direction on the surface to be scanned regardless of the orientation of the element.

In the multi-beam scanning optical system, all the beam spots should move within (i.e., traverse) a width of an imaging area so that the imaging area can be exposed to the beams. If the plurality of beam spots are arranged to align obliquely with respect to the main scanning direction, the scanning lines formed by the plurality of beam spots are shifted with each other in the main scanning direction. In such a case, it becomes necessary to elongate a width of each scanning line so that each beam traverses the imaging area. In order to elongate the scanning lines, it becomes necessary to use a larger polygonal mirror to broaden a deflection angle at which each beam scans. In view of a recent trend of downsizing of the imaging apparatus, it is not preferable to have such a configuration, and the plurality of beams are preferably aligned along a line which is perpendicular to the main scanning direction.

Generally, a scanning optical system is provided with a synchronizing signal detecting optical system for detecting a scanning position of each beam, which is used for controlling an imaging start point of each scanning line.

A typical synchronizing signal detecting optical system includes a photo sensor which detects a laser beam before it enters the imaging area. A predetermined period after the photo sensor detects the laser beam, modulation of the laser beam is started so that the image is formed from the imaging start position (i.e., the upstream end of the imaging area). If all of the plurality of beams are located at the same position in the main scanning direction, all the laser beams are incident on the photo sensor at the same time. Then, a single pulse signal is output by the photo sensor as the synchronizing signal. In such a case, all of the plurality of beams are started to be modulated after the same predetermined period has passed after the output of the pulse signal.

Practically, it is difficult to arrange the plurality of scanning lines at the same positions in the main scanning direction. It is because, all the beam spots are difficult to be aligned at an initial setting stage, and/or due to an external reason such as an oscillation at use, the relative positions of the plurality of beams may be changed to shift from each other in the main scanning direction. If two beam spots are slightly shifted in the main scanning direction, two pulse signals are output by the photo sensor within a very short period of time. In such a case, whichever pulse signal is used as the synchronizing signal, one of the two beam spots is not started to be modulated accurately, and therefore, the imaging start point of one of the two scanning lines is shifted from the predetermined position.

SUMMARY OF THE INVENTION

It is therefore an object of the invention to provide an improved multi-beam scanning optical system in which a plurality of scanning lines formed by a plurality of beams are aligned in the main scanning direction, and further, an imaging start point of each scanning line can be adjusted accurately.

For the above object, according to the present invention, there is provided a scanning optical system used for exposing a predetermined Imaging area defined on a surface to be scanned to a plurality of laser beams, which is provided with a plurality of light sources that emit a plurality of laser beams having different wavelengths, respectively, a single deflector which deflects the plurality of laser beams simultaneously, an imaging optical system that converges the plurality of laser beams deflected by the single deflector on the surface to be scanned, and a beam detector that receives the plurality of laser beams directed to outside of the predetermined imaging area via at least one of lens elements included in the imaging optical system, a synchronizing signal being generated upon detection of each of the plurality of light beams by the beam detector. It should be noted that an optical characteristic of the imaging optical system is configured such that the laser beams directed to the predetermined imaging area are aligned in a scanning direction, while the laser beams directed to the beam detector are shifted in the scanning direction.

With this configuration, a plurality of beams are aligned in the scanning direction when the beams are directed to the imaging area. Further, the beams are shifted in the scanning direction when the beams are directed to the beam detector. Accordingly, a plurality of laser beams are independently detected, and the size of the deflector can be reduced since the scanning lines formed by the plurality of beams are aligned within the imaging area.

Optionally, the single deflector includes a polygonal mirror having a plurality of reflecting surfaces, one of the plurality of reflecting surfaces reflecting the plurality of laser beams at each scan. The polygonal mirror is generally rotated about its central axis so that the laser beams reflected by the reflecting surface scan within a certain angular range.

Further optionally, the beam detector may include a single light receiving element, each of the plurality of laser beams being incident on the single light receiving element.

Furthermore, the imaging optical system may include at least one refractive lens element and a diffractive lens structure formed onto the refractive lens element so that the imaging optical system exhibits the above-described optical characteristic.

In a particular case, the diffractive lens structure may be formed in an predetermined area on a surface of the refractive lens. The laser beams directed to the imaging area pass through the predetermined area, while the laser beams directed to the beam detector pass through an area outside the predetermined area of the refractive lens.

According to an embodiment, the diffractive lens structure compensates for a lateral chromatic aberration of the at least one refractive lens. In other words, the area through which the laser beams directed to the beam detector pass provides the lateral chromatic aberration, which causes the plurality of beams directed to the beam detector to shift from each other in the scanning direction.

According to another aspect of the invention, there is provided a scanning optical system used for exposing a predetermined imaging area defined on a surface to be scanned, which is provided with a plurality of light sources that emit a plurality of laser beams having different wavelengths, respectively, a single deflector which deflects the plurality of laser beams simultaneously, an imaging optical system that converges the plurality of laser beams deflected by the single deflector on the surface to be scanned, and a beam detector that receives the plurality of laser beams directed to outside of the predetermined imaging area via at least one optical element included in the imaging optical system. The imaging optical system has a first range and a second range along a scanning direction which are defined such that the laser beams directed to the imaging area pass through the first range, while the laser beams directed to the beam detector pass through the second range. The imaging optical system being configured such that, within the first range, a lateral chromatic aberration of the imaging optical system being compensated for, and that within the second range, a lateral chromatic aberration resides so that the plurality of laser beams are separated from each other in the scanning direction thereof.

Optionally, an optical characteristic of the imaging optical system, within the first range, is configured such that a plurality of beam spots respectively formed by the plurality of laser beams within the imaging area are aligned in the scanning direction, while the plurality of laser beams are incident on the beam detector at different timings.

BRIEF DESCRIPTION OF THE ACCOMPANYING DRAWINGS

FIG. 1 schematically shows an arrangement of optical elements of a scanning optical system according to an embodiment of the invention;

DESCRIPTION OF THE EMBODIMENT

Hereinafter, the scanning optical system according to an embodiment of the invention will be described with reference to the accompanying drawings.

Figure 1:
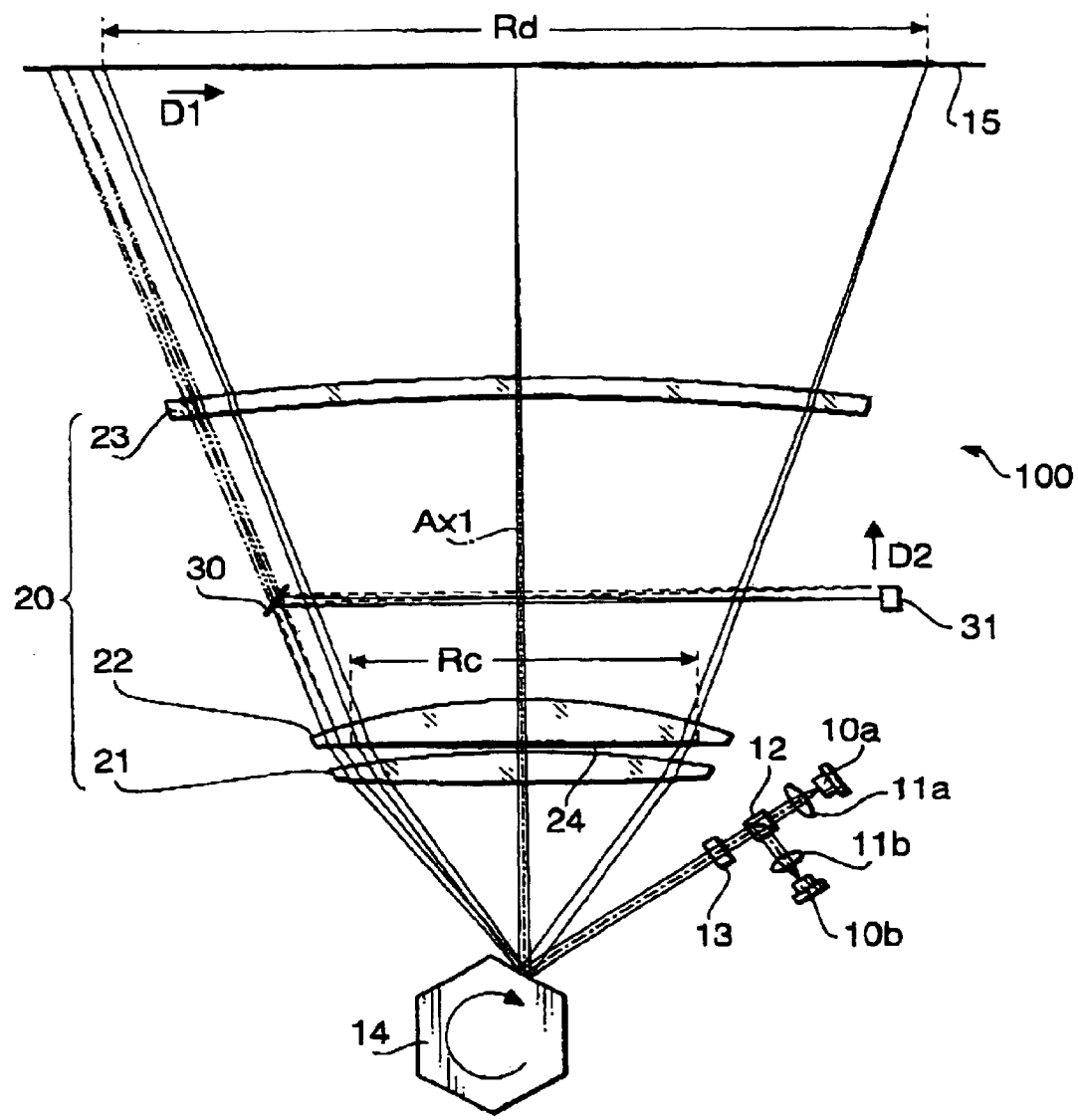

FIG. 1 schematically shows an arrangement of optical elements of a scanning optical system 100 according to an embodiment of the invention. The scanning optical system 100 shown in FIG. 1 is an exposure unit for a laser beam printer. The exposure unit emits a scanning laser beam, which is ON/OFF modulated in accordance with an image to be formed. The scanning beam is converged on a surface 15 to be scanned. The surface 15 is, for example, a surface of a photoconductive drum, and an electrostatic latent image is formed thereon.

The scanning optical system 100 shown in FIG. 1 includes first and second laser diodes 10a and 10b, which emit two laser beams having different wavelengths, respectively. The laser beams are collimated by the collimating lenses 11a and 11b, and are directed in the same direction by a beam combiner 12. The beam combiner 12 is configured such that, in accordance with the polarizing characteristics of the laser beams, the laser beam emitted by the first laser diode 10a is transmitted through the beam combiner 12, and the laser beam emitted by the second laser diode 10b is reflected by the beam combiner 12.

The two laser beams emerged from the beam combiner 12 are converged by a cylindrical lens 13, which has a positive power only in an auxiliary scanning direction. The two laser beams passed through the cylindrical lens 13 are deflected simultaneously by a polygonal mirror 14, which rotates at a predetermined angular speed.

It should be noted that the two laser beams are incident on the polygonal mirror 14 at the same angle, with respect to a reflection surface thereof, in the main scanning direction. The two laser beams, however, strike two different positions on the reflection surface of the polygonal mirror 14, respectively, i.e., at positions along a line extending in the auxiliary scanning direction.

With this configuration, in the main scanning direction, each reflection surface of the polygonal mirror 14 has the same size as that of a polygonal mirror for a single laser beam. Therefore, although a plurality of beams are used, the size of the polygonal mirror 14 is not enlarged at least in the main scanning direction.

The laser beams deflected by the polygonal mirror 14 are converged on the surface 15 via an fθ lens 20, which is an imaging lens consisting of three lens elements, and form two beam spots. In the embodiment, the polygonal mirror 14 rotates clockwise in FIG. 1, and the two beam spots formed on the surface 15 move in direction D1 as the polygonal mirror 14 rotates.

The fθ lens 20 includes, from the polygonal mirror side to the surface 15, a biconvex lens (first lens) 21 having a positive power both In the main and auxiliary scanning directions, a plano-convex lens (second lens) 22 having a positive power both in the main and auxiliary scanning direction, and an elongated lens 23 (third lens) having a positive power substantially only in the auxiliary scanning direction. The first and second lenses 21 and 22 are arranged closer to the polygonal mirror 14, while the third lens 23 is arranged at an intermediate position between the polygonal mirror 14 and the surface 15.

Figure 2A:
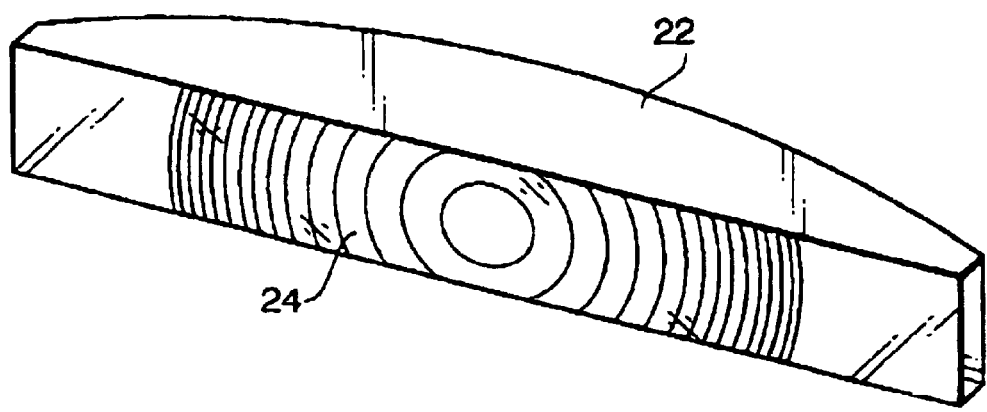
FIG. 2A is a perspective view of a lens showing a diffractive lens structure formed thereon.
Figure 2B:
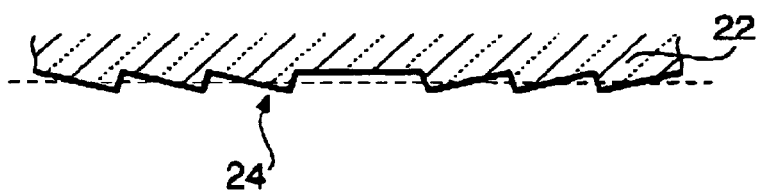
FIG. 2B is an enlarged cross sectional view showing the diffractive lens structure.

On a polygonal mirror side surface of the second lens 22, an area Rc is defined. The laser beams incident on an imaging area Rd defined on the surface 15 pass through the area Rc. On the area Rc, a diffractive lens structure 24 is formed. Thus, any beam which is incident on the surface 15 within the area Rc passes through the diffractive lens structure 24. The diffractive lens structure 24 has a concentric pattern about an optical axis as shown in FIG. 2A. As shown in FIG. 2B, which is an enlarged cross sectional view, the concentric pattern has a stepped structure. The diffractive lens structure 24 functions to compensate for a lateral chromatic aberration due to the refractive lens elements of the fθ lens 20. With this function of the diffractive lens structure 24, the two bean spots formed by two laser beams have different wavelengths, and scan simultaneously at the same position in the main scanning direction within the imaging area Rd. Since the beam spots are separated in the auxiliary scanning direction, two scanning lines (i.e., loci of the scanning beam spots) are formed on the surface 15 at one scan.

As shown in FIG. 1, a beam separation mirror 30 is arranged between the second lens 22 and the third lens 23. The beam separation mirror 30 reflects a beep directed to a position outside the imaging area Rd as a monitor beam. The monitor beam reflected by the separation mirror 30 is converged on a light receiving element 31 which functions as a synchronizing signal detection system. The monitor beam moves in direction D2, and transverses the light receiving element 31, which is located at a position corresponding to a position upstream side of the imaging area Rd on the surface 15, every time the surface of the polygonal mirror 14 on which the beam is incident changes. The light receiving element 31 outputs two pulses which are used for controlling the laser diodes 10a and 10b so that modulation starts when each beam reaches the imaging start point at every scan.

As described above, the diffractive lens structure 24, which compensates for the lateral chromatic aberration, is formed only in the area Rc of the second lens 22, and only the beam incident on the imaging area Rd passes through the area Rc of the second lens 22.

Therefore, In the area of the lens other than the area Rc; the lateral chromatic aberration is generated. Accordingly, the two laser beams which have different wavelengths and are emitted by the laser diodes 10a and 10b, respectively, are separated as indicated by solid and broken lines when they are incident on the light receiving element 31. Therefore, the light receiving element 31 outputs two synchronizing pulses at every scan. It should be noted that the optical paths indicated by two-dotted lines represent an imaginary optical path when the separation mirror 30 is not provided.

For example, if the laser beam, which has a wavelength of λ1 and is emitted by the first laser diode 10a, transverses the light receiving element 31 firstly, and then, the laser beam, which has a wavelength of λ2 and is emitted by the second laser diode 10b, transverses the light receiving element 31, due to the lateral chromatic aberration of the fθ lens 20, the firstly output synchronizing pulse is used for adjusting the imaging start position corresponding to the laser beam emitted by the first laser diode 10a, and the secondly output synchronizing pulse is used for adjusting the imaging start position corresponding to the laser beam emitted by the second laser diode 10b.

In the embodiment, a reference status is defined as a status where the two beam spots pass the imaging start point of the imaging area Rd at the same time, while a time difference between the first synchronizing pulse and the second synchronizing pulse when the two beams pass the beam detecting element 31 is Δt0. Given that a period of time between the first synchronizing pulse and a time when the first beam spot reaches the imaging start point is Δt1, a time period between the second synchronizing pulse and a time when the second beam spot reaches the image start point is represented by Δt1−Δt0.

As above, the laser diodes 10a and 10b are controlled based on the synchronizing pulses output at different timings, respectively.

Even when the beam spots are shifted from each other within the imaging area Rd due to errors of Initial settings or external disturbances, it is possible to adjust the positions of the beam spots according to the embodiment.

For example, if a beam spot formed by the laser beam whose wavelength is λ1 antecedes a beam spot formed by the laser beam whose wavelength is λ2 by a time period of Δt2, a period of time between the first synchronizing pulse and a time when the first beam spot reaches the imaging start point is set to Δt1, and a time period between the second synchronizing pulse and a time when the second beam spot reaches the imaging start point is set to Δt1−Δt0. In this case, the second laser diode 10b is controlled to be driven earlier than in the above case (i.e., the beams are in the reference status) by Δt2, and at this timing, the beam spot formed by the second laser beam is located at the imaging start point. Thus, with the above control, the imaging start points of the two beams can be adjusted in the main scanning direction.

Next, a numerical example of the above-described scanning optical system will be indicated. In this example, the wavelength λ1 is 680 (nm) and the wavelength λ2 is 780 (nm). TABLE 1 below indicates a numerical structure of the scanning optical system 100 on the surface side elements with respect to the cylindrical lens 13. A symbol ry represents a radius of curvature in the main scanning direction, a symbol rz represents a radius of curvature in the auxiliary scanning direction (which is omitted when a surface is rotationally symmetrical), d represents a distance between adjacent surfaces on the optical axis, and n680 and n780 respectively denote refractive indexes for wavelengths of 680 nm and 780 nm. In TABLE 1, surfaces #1 and #2 represent those of the cylindrical lens 13, surface #3 represents a reflection surface of the polygonal mirror 14, surfaces #4 and #5 represent those of the first lens 21, surfaces #6 and #7 represent those of the second lens 22, and surfaces #8 and #9 represent those of the third lens 23 of the fθ lens 20.

TABLE 1

| scanning width 210 mm | | | focal length in the main scanning direction 180.31 mm | | |
|---|---|---|---|---|---|
| surface number | ry | rz | d | n680 | n780 |
| #1 | inf. | 40.000 | 4.000 | 1.51315 | 1.51072 |
| #2 | inf. | | 57.800 | | |
| #3 | inf. | | 55.000 | | |
| #4 | 1000.000 | | 8.350 | 1.48849 | 1.48617 |
| #5 | −270.000 | | 2.000 | | |
| #6 | inf. | | 12.530 | 1.48849 | 1.48617 |
| #7 | −154.500 | | 86.680 | | |
| #8 | −700.000 | 28.850 | 5.000 | 1.48849 | 1.48617 |
| #9 | −670.000 | | 85.200 | | |

Surface #4 (i.e., the polygonal mirror side surface of the first lens 21) is an aspherical surface rotationally symmetrical with respect to the optical axis thereof. The rotationally symmetrical aspherical surface is generally expressed by SAG (i.e., a distance from a plane tangential to the surface on the optical axis) X(h), which is a function of a height h of a point on the aspherical surface from the optical axis. The function is expressed by formula (1).

$$X(h) = \frac{Ch^2}{1 + \sqrt{1-(1+K)C^2h^2}} + A_4h^4 + A_6h^6 + A_8h^8\ldots \quad (1)$$

where, C is a curvature (i.e., 1/ry) of the aspherical surface on the optical axis, K is a conical coefficient, and $A_4$, $A_6$, $A_8$ are fourth, sixth and eighth order aspherical coefficients.

In TABLE 1, ry for surface #4 represents the radius of curvature on the optical axis, and the conical coefficient K and the fourth, sixth and eighth order aspherical coefficients for the function (1) are indicated in TABLE 2 below.

TABLE 2

| | |
|---|---|
| K | 0.4359 |
| A4 | $-1.05000 \times 10^{-7}$ |
| A6 | $1.53885 \times 10^{-11}$ |
| A8 | $-1.22494 \times 10^{-15}$ |

Each of the surfaces #5, #7 and #9 (i.e., the surface 15 side surface of the first lens 21, second lens 22 and third lens 23) is a spherical surface. The surface #8 (i.e., the polygonal mirror side surface of the third lens 23) is a toric surface. The surface #6 (i.e., the polygonal mirror side surface of the second lens 22) is configured such that the diffraction lens structure 24 is formed on a base curve that is a planar surface.

The diffractive lens structure 24 is formed within a range of ±44.5 mm, with the optical axis being centered therein, in the main scanning direction. The steps and pitch thereof are determined such that the focal length of the diffraction lens structure for the light whose wavelength is 780 nm is 4871.802 mm.

Figure 3A:
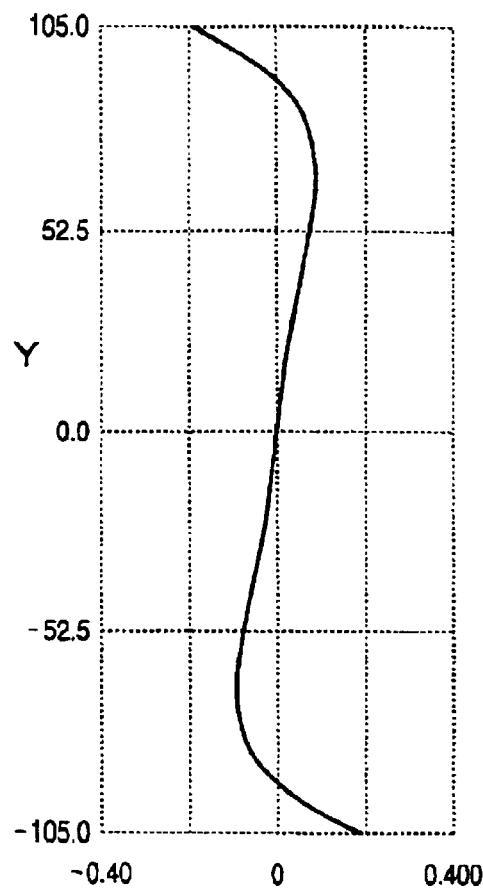
FIG. 3A is a graph showing a linearity error of the optical system shown in FIG. 1.
Figure 3B:
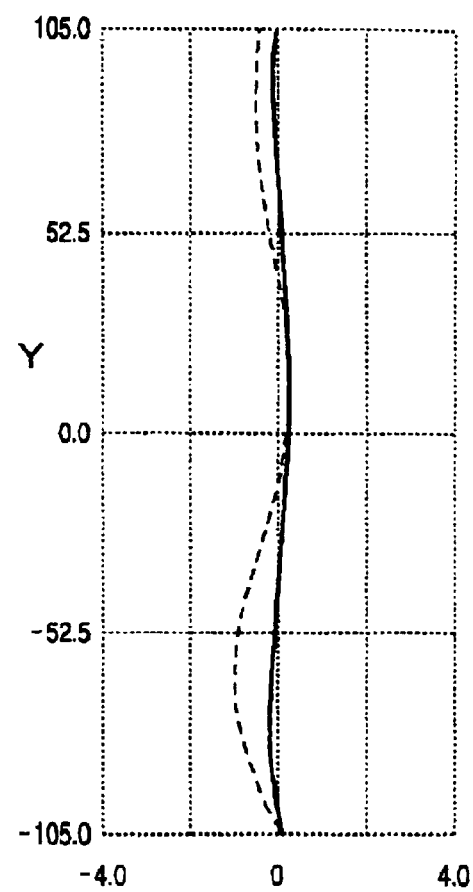
FIG. 3B is a graph showing curvature of field.

FIGS. 3A and 3B are graphs showing characteristics of the optical system configured as above. FIG. 3A shows a linearity error of the optical system, and FIG. 3B shows curvature of field (broken line: main scanning direction; solid line: auxiliary scanning direction). In each graph, a vertical axis represents an image height Y (unit: mm), or a distance from the optical axis Ax1 of the fθ lens 20 in the main scanning direction, and a horizontal axis represents the amount of the aberration (unit: mm).

Figure 4A:
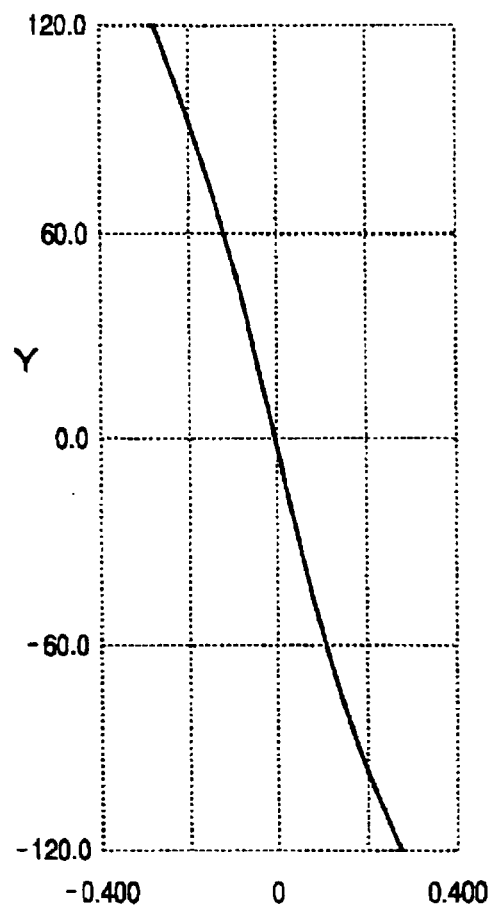
FIG. 4A is a graph showing lateral chromatic aberration when the diffractive lens structure is not formed.
Figure 4B:
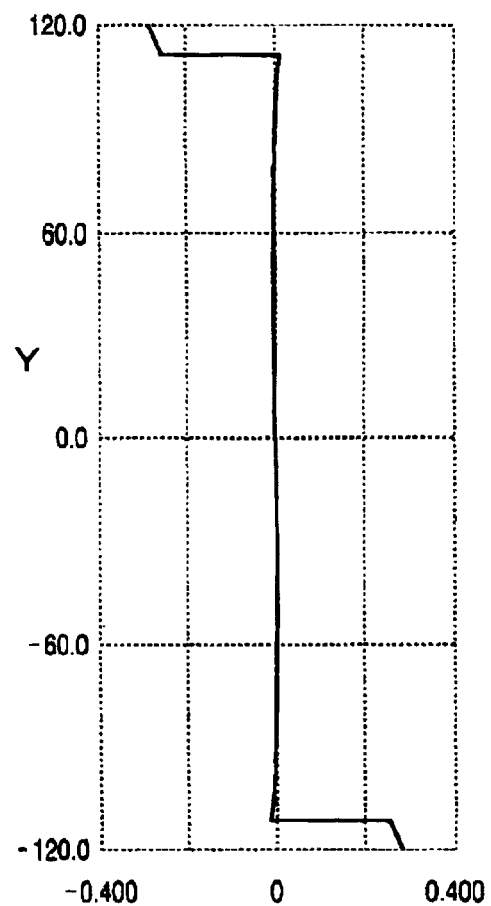
FIG. 4B is a graph showing lateral chromatic aberration when the diffractive lens structure is formed.

FIGS. 4A and 4B show the lateral chromatic aberration. In FIGS. 4A and 4B, a deviation of a position of the beam spot for the wavelength of 680 nm with respect to the position of the beam spot for the wavelength of 780 nm is Indicated. FIG. 4A is a graph when the diffractive lens structure is not formed, and FIG. 4B is a graph when the diffractive lens structure 24 is formed.

As is understood from FIGS. 4A and 4B, a relatively large chromatic aberration when the diffractive lens 24 is not formed is well compensated by forming the diffractive lens structure 24. It should be noted, however, the diffractive lens structure 24 is formed only in the area corresponding to the imaging area Rd. Therefore, at portions outside the area (i.e., the upper and lower portions of FIG. 4B) where the diffractive lens structure is not formed, the chromatic aberration is not compensated.

Therefore, even If the two beam spots are aligned in the main scanning direction within the imaging area Rd, the two laser beams are separated in the main scanning direction when they are incident on the light receiving element 31. Specifically, the laser beam emitted by the first laser diode boa (whose wavelength is 680 nm) transverses the light receiving element 31 firstly, and then the laser beam emitted by the second laser diode 10b (whose wavelength is 780 nm) traverses the light receiving element 31.

In this numerical example, the imaging area Rd is defined as an area within a range of ±105.0 mm with respect to the optical axis Ax1 in the main scanning direction, and the light receiving element 31 is arranged at an optical position corresponding to a point 120 mm apart from the optical axis Ax1 on the surface 15. In this configuration, the deviated amount of the two laser beams at the light receiving element 31 is 0.274 mm. If the polygonal mirror 14 rotates at 12000 rpm, the time difference $\Delta t0$ between a time at which the first beam traverses the light receiving element 31 and a time at which the second beam traverses the light receiving element 31 is 606 ns (nanosecond).

Accordingly, in the optical scanning system configured as above, by differentiating a time period from the first synchronizing signal to the imaging start timing and a time period from the second synchronizing signal to the image start timing by 606 ns, the imaging start points for the two laser beams can be adjusted in the main scanning direction even if the relative positions of the beam spots are shifted due to the error in the initial settings or some external disturbance.

The present disclosure relates to the subject matter contained in Japanese Patent Application No. 2000-390182, filed on Dec. 22, 2000, which is expressly incorporated herein by reference in its entirety.

What is claimed is:

1. A scanning optical system for exposing a predetermined imaging area on a surface to be scanned to a plurality of laser beams, comprising:

a plurality of light sources that emit a plurality of laser beams having different wavelengths, respectively;

a single deflector which deflects the plurality of laser beams simultaneously;

an imaging optical system that converges the plurality of laser beams deflected by said single deflector on the surface to be scanned; and a beam detector that receives the plurality of laser beams directed to outside of the predetermined imaging area via at least one lens element included in said imaging optical system, a synchronizing signal being generated upon detection of each of the plurality of light beams by said beam detector, an optical characteristic of said imaging optical system being configured such that the laser beams incident on said predetermined imaging area are aligned in a scanning direction with respect to one another, while the laser beams incident on said beam detector are shifted in the scanning direction with respect to one another.

2. The scanning optical system according to claim 1, wherein said single deflector comprises a polygonal mirror having a plurality of reflecting surfaces, one of said plurality of reflecting surfaces reflecting the plurality of laser beams during each scan, said polygonal mirror being rotated so that the laser beams reflected by said reflecting surface scan.

3. The scanning optical system according to claim 1, wherein said beam detector comprises a single light receiving element, each of the plurality of laser beams being incident on said single light receiving element.

4. The scanning optical system according to claim 1, wherein said imaging optical system includes at least one refractive lens element, and a diffractive lens structure is formed onto said refractive lens element so that said imaging optical system exhibits said optical characteristic.

5. The scanning optical system according to claim 4, wherein said diffractive lens structure is formed in an predetermined area on a surface of said refractive lens element, the laser beams directed to said imaging area passing through said predetermined area, the laser beams directed to said beam detector passing through an area outside of said predetermined area.

6. The scanning optical system according to claim 5, wherein said diffractive lens structure compensates for a lateral chromatic aberration of said at least one refractive lens element.

7. A scanning optical system for exposing a predetermined imaging area on a surface to be scanned, comprising:
- a plurality of light sources that emit a plurality of laser beams having different wavelengths, respectively;
- a single deflector which deflects the plurality of laser beams simultaneously;
- an imaging optical system that converges the plurality of laser beams deflected by said single deflector on the surface to be scanned; and
- a beam detector that receives the plurality of laser beams directed to outside of the predetermined imaging area via at least one optical element included in said imaging optical system,
- said imaging optical system having a first area and a second area on an incident surface of the imaging optical system, the laser beams directed to said imaging area passing through said first area, the laser beams directed to said beam detector passing through said second area, said imaging optical system being configured such that, within said first area, a lateral chromatic aberration of said imaging optical system is compensated for, and such that within said second area, a lateral chromatic aberration remains so that the plurality of laser beams are separated from each other in the scanning direction.

8. The scanning optical system according to claim 7, wherein an optical characteristic of said imaging optical system, within said first area, is configured such that a plurality of beam spots respectively formed by the plurality of laser beams within said imaging area are aligned in the scanning direction, while the plurality of laser beams passing through said second area are incident on said beam detector at different timings.

9. A scanning optical system for exposing a predetermined imaging area on a surface to be scanned to a plurality of laser beams, comprising:
- a plurality of light sources that emit a plurality of laser beams having different wavelengths, respectively, during a scanning operation;
- a single deflector which deflects the plurality of laser beams during the scanning operation;
- an imaging optical system that converges the plurality of laser beams deflected by said single deflector on the surface to be scanned; and
- a beam detector that receives the plurality of laser beams directed to outside of the predetermined imaging area via at least one lens element included in said imaging optical system, a synchronizing signal being generated upon detection of each of the plurality of light beams by said beam detector, an optical characteristic of said imaging optical system being configured such that the laser beams incident on said predetermined imaging area are aligned with respect to one another in a scanning direction, while the laser beams incident on said beam detector are shifted with respect to one another in the scanning direction.

* * * * *